United States Patent
Yarborough et al.

(10) Patent No.: US 6,718,388 B1
(45) Date of Patent: Apr. 6, 2004

(54) SECURED SESSION SEQUENCING PROXY SYSTEM AND METHOD THEREFOR

(75) Inventors: William Jordan Yarborough, Altamonte Springs, FL (US); Jia Jin Zhuang, Princeton JCT, NJ (US)

(73) Assignee: JP Morgan Chase Bank, NY (US)

( * ) Notice: Subject to any disclaimer, the term of this patent is extended or adjusted under 35 U.S.C. 154(b) by 0 days.

(21) Appl. No.: 09/314,482

(22) Filed: May 18, 1999

(51) Int. Cl.⁷ .............................................. G06F 15/16
(52) U.S. Cl. ..................... 709/227; 709/217; 709/219; 709/229; 713/200; 713/201
(58) Field of Search ................ 709/217–219, 709/220–229; 713/200, 201

(56) References Cited

U.S. PATENT DOCUMENTS

| | | | | |
|---|---|---|---|---|
| 5,191,650 A | * | 3/1993 | Kramer et al. ............... | 709/227 |
| 5,442,749 A | * | 8/1995 | Northcutt et al. ........... | 709/219 |
| 5,944,823 A | | 8/1999 | Moore et al. | |
| 6,104,716 A | * | 8/2000 | Crichton et al. ............. | 370/401 |
| 6,170,012 B1 | * | 1/2001 | Coss et al. ................... | 709/225 |
| 6,199,113 B1 | * | 3/2001 | Alegre et al. ............... | 709/219 |
| 6,233,541 B1 | * | 5/2001 | Butts et al. .................. | 370/466 |
| 6,252,878 B1 | * | 6/2001 | Locklear, Jr. et al. ....... | 370/401 |
| 6,374,298 B2 | * | 4/2002 | Tanno ......................... | 709/227 |
| 6,381,638 B1 | * | 4/2002 | Mahler et al. ............... | 709/220 |
| 6,385,644 B1 | * | 5/2002 | Devine et al. ............... | 709/203 |

FOREIGN PATENT DOCUMENTS

| | | |
|---|---|---|
| GB | 2323757 | 9/1998 |
| WO | 99/15950 | 4/1999 |

OTHER PUBLICATIONS

Chen, L. T. et al.: "Reflective object–oriented distributed system for heterogenous multimedia environments" Computer Communications, NL, Elsevier Science Publishers BV, Amsterdam, vol, 19, No. 8, Jul. 1, 1996; pp. 698–706, XP004052757, ISSN: 0140–3664; p. 705, left–hand column, line 25 through p. 706, left–hand column, line 9.

* cited by examiner

*Primary Examiner*—Wen Tai Lin
(74) *Attorney, Agent, or Firm*—Dickstein, Shapiro, Morin & Oshinsky, LLP

(57) ABSTRACT

A system and method are provided for securing a service providers hosts such that unauthorized access to the hosts is prevented. The system allows the service provider's hosts to be logically and physically located at convenient spots within the service provider's private network. User's can be located anywhere within a global public network such as the Internet. The system uses a first server coupled to the first network in which the first server receives a session establishment request from the user terminal and generates a connection request in response to the session establishment request. A second server coupled to the first server and the second network receives the connection request and establishes communications with the host in accordance with the connection request. The second server initiates communications by establishing a communication control session with the first server before the first server will send the connection request to the second server.

26 Claims, 3 Drawing Sheets

SECURED SESSION SEQUENCING PROXY SYSTEM AND METHOD THEREFOR

BACKGROUND OF THE INVENTION

The present invention relates to network data communications, and more particularly to establishing a secure data communication session between a public user and an internal host in which the host and internal network are secured from unauthorized access.

The proliferation of users and services on global computer networks such as the Internet raises security concerns for both users and service providers. Users want the data they submit to providers and the data they receive from providers to be free from unauthorized interception and use. Similarly, service providers want their hosts and systems secured from unauthorized access and intrusion by "hackers". Service providers, especially those involved with financial services view their computing hardware and software as critical assets. These service providers rely on the trust of their customers who assume that no one will be able to access customer records or otherwise negatively impact the service.

Prior on-line services used dedicated dial-up facilities, and customized security software on the user's terminal and the host system to prevent unauthorized access. In other words, users were forced to access the service provider's system by dialing a special telephone number. Transmitted data was secured by encryption, and incoming dial-up calls were only accepted from authorized users. Security software was also implemented on the provider's host system. This became very inefficient and cumbersome as users began to subscribe to multiple on-line services.

Global computer networks such as the Internet allow users to access many different hosts and services from their computers via a single access connection. While this has enhanced users' abilities to access information and conduct business, global networking has complicated service providers' security mechanisms. For example, a service provider must allow inbound (from the network to the service) access to their site for everybody. This results from the service providers' inability to be sure of the originating computer address, such as a TCP/IP (Transmission Control Protocol/Internet Protocol) address from which actual or prospective users will communicate. It is too inefficient and impractical to allow access on an address by address basis, especially since computer addresses can change every time a user connects to their network access provider. As a result, service providers must allow access for the entire network community, and service providers are forced to use other methods to secure access to their hosts, and to secure the data contained on their hosts.

Security systems and methods have been developed which employ the use of special security software on both the user's terminal and the host system. These types of security systems use a public and private key pair challenge mechanism using data encryption and digital signatures for authentication. This provides a secure session, but every user must have a copy of this software in order to access the host. Service providers offering this type of access software must offer customers installation support and problem determination services, and must also update the special software as needed. This increases the complexity of the system and drives up the cost of providing the service.

Other encryption software, such as Secure Sockets Layer (SSL) handshake protocol is used for client and host authentication. SSL is application independent and negotiates encryption keys and allows the user terminal to authenticate the host prior to allowing data communications. SSL is typically implemented in Internet web browser software. Thus, it facilitates secure data transmission between a user and a host. This allows a user to be sure that communication between their terminal and the host is free from unauthorized interception, but still does not protect the service provider's host from security attacks.

Service providers have attempted to secure their hosts by interposing firewalls and proxy servers between their hosts and the user community. Firewalls are typically programmed to restrict inbound access to a particular set of users, or to restrict access to a particular set of hosts or ports, i.e., services. In a system using a proxy server, the user terminal communicates with the proxy server which in turn communicates with the host. In this configuration, a user establishes a session with a proxy server and the proxy server establishes a session with the host.

As discussed above, restricting user access is not practical, and restricting services still leaves a security hole through which crafty hackers can enter. In other words, since a small opening must be maintained in the firewall to establish the inbound connection, is it still possible for unauthorized users to access the host.

Further security breaches are possible because firewalls typically allow direct session communications between the user's terminal and the host system. Direct session communication refers to a user terminal addressing data packets such that the final destination address is indicated as the terminus host machine. This provides the user with the actual host address. It is desired to protect the host address in confidence such that users do not know what the host address is and can not attempt to send unauthorized data directly to the host in an attempt to access it in a manner which is not desired by the service provider.

The security exposure situation is not improved much through the use of a proxy server, because a hacker who compromises the proxy server can use the proxy server as a base for accessing the provider's hosts. In a typical proxy server environment, the network and any firewalls must "trust" the proxy and allow data communications to flow between the proxy and the host. In other words, hosts must accept data transmitted from a proxy, and firewalls must allow traffic to or from the proxy to users and hosts to flow freely.

As discussed above, in a typical communication session between a user and a host through a proxy server, the proxy server accepts the user's inbound (from user to server) session connection request, and invokes a new session request between the proxy server and the host. Although this arrangement and method hides the host address from the user, a connection is still established by the proxy server to the host. Thus, any interposing firewalls must allow the proxy to establish a connection with a host. As a result, gaining access to the proxy, authorized or unauthorized, allows access to a provider's host.

FIG. 1 shows an example of a typical security hardware arrangement. In a typical environment, such as the Internet, users 2 need to access a service available on host 4 through public network 6. In addition, a person responsible for managing host 4 will access that host using management terminal 8 through private network 10. Public network 6 is a global computer network such as the Internet, whereas private network 10 is a corporation's intra-network. Security device 12 is interposed between public network 6 and private network 10 such that users 2 can communicate with host 4, but are not permitted to communicate with private network 10 or any hosts thereon. Security device 12 can be a firewall or a proxy server. Security device 12 can be configured so that users on private network 10 can access public network 6 or host 4. In the arrangement shown in FIG. 1, the placement of host 4 on a network segment accessible by both public network 6 users and private network 10 users is called a demilitarized zone (DMZ).

As discussed above, the arrangement of FIG. 1 leaves open a number of potential security problems, and limits the placement of hosts to these DMZ segments. Using the prior art arrangement, a user 2 is establishing a direct session with host 4, or a proxied session with host 4 through security device 12. An unauthorized user who gains access to security device 12 may be able to then access private network 10, management terminal 8 and any other devices on the private network. An unauthorized user compromising security device 12 may also be able to access data on host 4 to which he is not entitled because host 4 is typically configured to trust the integrity of data received from security device 12. Thus, this arrangement is problematic from a security standpoint.

In addition, because host 4 and others like it must be placed on DMZ segments, corporate personnel wishing to access host 4 must either do so through security device 12 or must physically go to the location of host 4 to access that host by a directly connected terminal or a terminal on the DMZ segment.

It is desirable to be able to configure security device 12 such that connections originating from private network 10 to host 4 or to public network 6 are not permitted, while simultaneously allowing corporate personnel to easily access host 4 for maintenance and support.

Of course, each component in the system adds processing delay, a point of failure, requires maintenance and upgrading and adds to the general complexity of the overall system. This situation is especially undesirable to financial institutions who seek to allow users to access only their own account information using a simple, easy to maintain hardware and software configuration.

SUMMARY OF THE INVENTION

It is an object of the present invention to provide a system and method for allowing standard proxies to securely route application session requests between a client and a host in which the user need not install special software to ensure security, and in which the provider need not introduce potential security holes into the configuration of the security equipment.

It is a further object of the invention to be able to physically and logically locate hosts within the private network so as to allow corporate personnel easy access to the hosts for maintenance and support, while simultaneously allowing secure access to host services by public users.

In order to achieve these objects, the present invention provides a system for communicating data using a data communication session between a user terminal and a host in which the user terminal is coupled to a first network and a host is coupled to a second network. The system comprises a first server coupled to the first network, the first server receiving a session establishment request from the user terminal and generating a connection request in response to the session establishment request. A second server coupled to the first server and the second network receives the connection request and establishes communications with the host in accordance with the connection request, the second server initiating communications by establishing a communication control session with the first server before the first server will send the connection request to the second server.

The present invention also provides a method for communicating data using a data communication session between a user terminal and a host in which the user terminal is coupled to a first network and a host is coupled to a second network. The method comprises the steps of establishing a control connection between a first server and a second server, the second server initiating the control connection, establishing a first session between the first server and the user terminal based on a user connection request, the first session transferring data between the user terminal and the first server, and using the control connection to establish a second session between the second server and the host and a third session between the first server and the second server, the second session transferring data between the second server and the host and the third session transferring data between the first server and the second server.

Other features and advantages of the present invention will become apparent from the following description of the invention which refers to the accompanying drawings.

Figure 1:
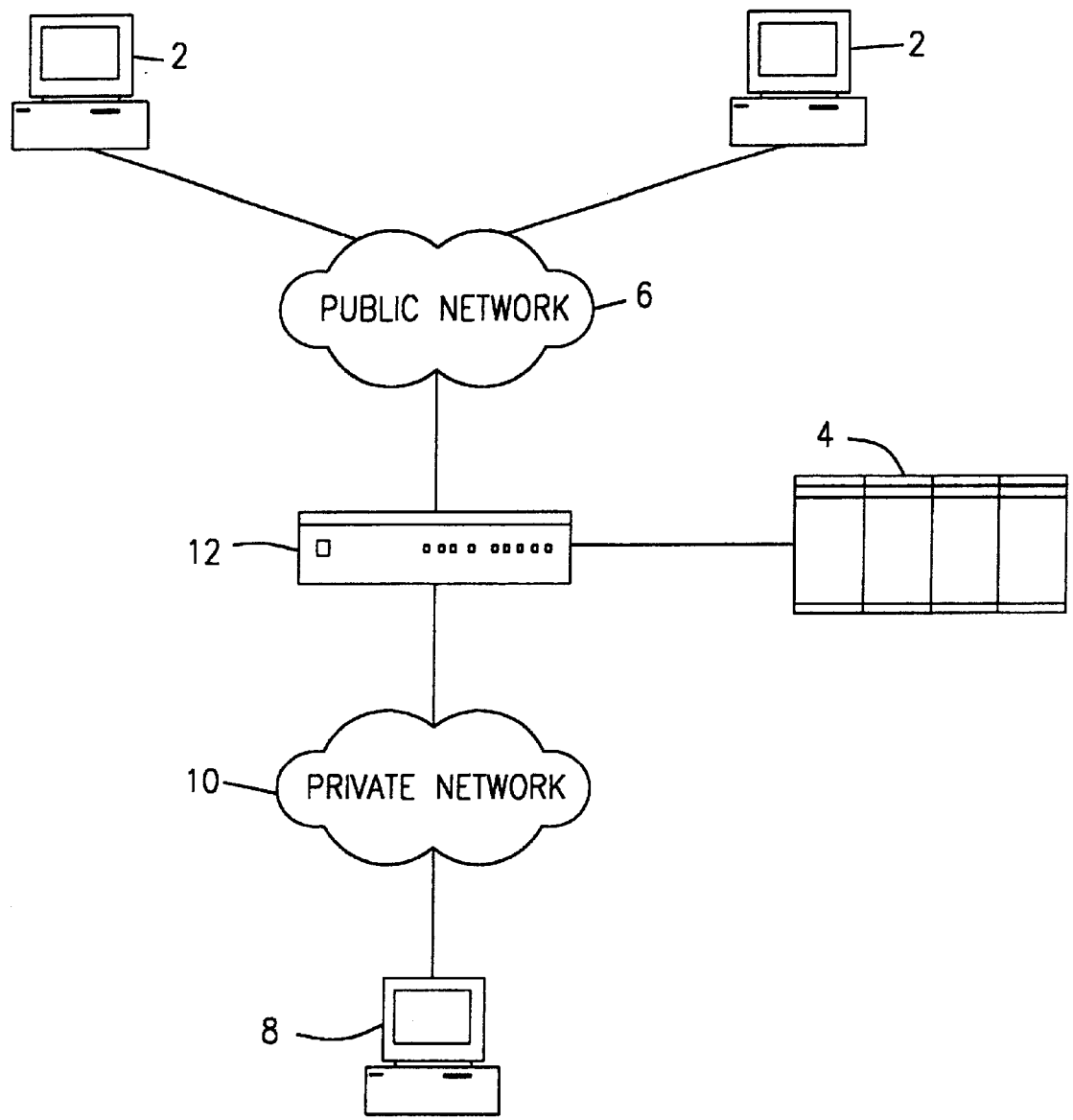
FIG. 1 is a diagram of a prior art security hardware arrangement.

For the purpose of illustrating the invention, there is shown in the drawings a form which is presently preferred, it being understood, however, that the invention is not limited to the precise arrangement shown.

DETAILED DESCRIPTION OF THE INVENTION

The following detailed description uses the terms "inbound" and "outbound" when referring to the flow of data communication traffic such as actual data payload and request/response data. As used herein, the term "inbound" refers to communication data originating at a public user terminal, such as user terminal 2, and terminating at a service provider's security system device or host. Conversely, "outbound" traffic refers to traffic flowing from the host or security system to a user terminal in public network 6.

Also, the term "port" as used herein refers to a logical communication port established via software such as a TCP/IP port. The term "socket" as used herein refers to its common computer programming usage in which a "socket" is a logical end point in a connection, including logical connections between processes running within the same computer. The connection, however, can be "connectionless" in the context of global networking such as the Internet in which a server supports many client requests but does not maintain the actual connection and longer than is necessary to service the immediate request. The term "thread" as used herein refers to its common computer programming usage in which a "thread" is a placeholder used to support multiple concurrent users of a single executing instance of a computer program.

Figure 2:
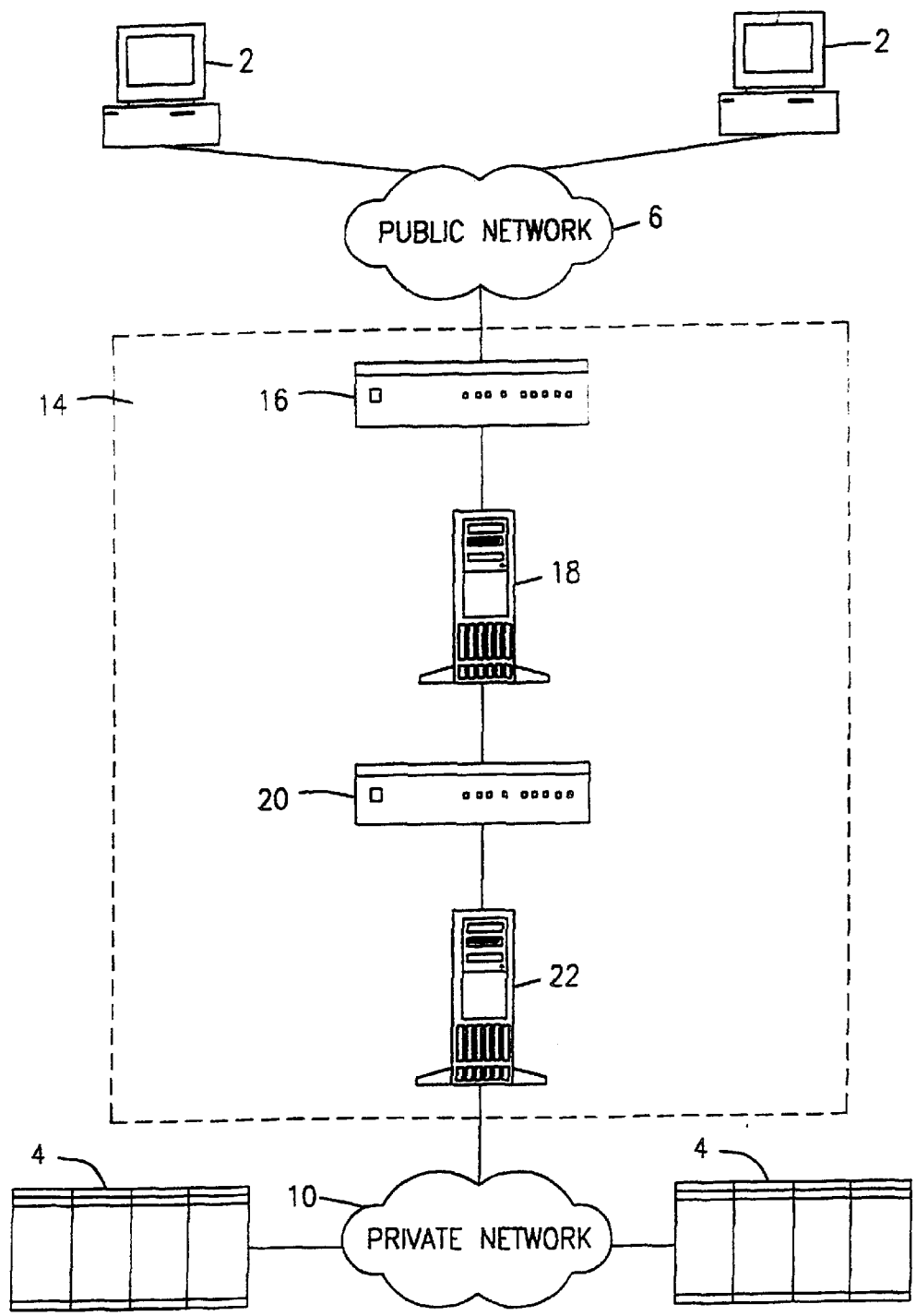
FIG. 2 is a diagram of the security hardware arrangement of the present invention.

With reference to the Figures in which like reference numerals refer to like elements, FIG. 2 shows the hardware arrangement of the present invention.

As shown in FIG. 2, security system 14 of the present invention is comprised of external firewall 16, public proxy server (PPS) 18, internal firewall 20 and gateway proxy server (GPS) 22. In the depicted arrangement, external firewall 16 is connected to public network 6 and to PPS 18. PPS 18 in turn is connected between external firewall 16 and internal firewall 20. PPS 18 can sit on an isolated segment such that there are no other devices attached or networked between PPS 18 and external firewall 16 on the outbound side, and PPS 18 and internal firewall 20 on the inbound side. GPS 22 connects internal firewall 20 to private network 10. Thus, physical connectivity from user terminal 2 to host 4 is as follows:

User Terminal 2⇌Public Network 6⇌External Firewall 16⇌PPS 18⇌Internal Firewall 20⇌GPS 22⇌Private Network 10⇌Host 4.

Although a physical path is provided between user terminal 2 and host 4, it should be noted that the logical flow of data and session establishment using the present invention does not allow user 2 to directly establish a service session with host 4.

External firewall 16 is a typical packet or session firewall which is configured to allow inbound access to specific logical ports, i.e. host services via TCP/IP ports, by allowing those connections to be made between user terminal 2 and PPS 18.

Internal firewall 20 can be a router or other typical device capable of packet filtering or session filtering, and is configured to only allow gateway proxy server 22 to initiate an outbound service connection to PPS 18 using a predetermined group of logical ports, such as TCP/IP port 8080. Internal firewall 20 is configured to deny and filter out any inbound connection requests, for example, connection requests originating at PPS 18, external firewall 16, public network 6 or user terminals 2 which attempt to establish a service connection to GPS 22, private network 10 or host 4. As is described below in detail, internal firewall 20 is configured to allow data flow between PPS 18 and GPS 22, but internal firewall 20 is configured such that only data communications between PPS 18 and GPS 22 are permitted once GPS 22 establishes a connection to PPS 18.

Hosts 4 and users terminals 2 are typical devices suitable for performing the functions required of host and user terminals respectively. For example, user terminal 2 can be a personal computer or hand-held computer device capable of accessing a global computer network such as the Internet. Host 4 can range in size and capability from a personal computer to a mainframe computer, and is sized according to the service provider's particular requirements. Also, host 4 can be logically and physically located anywhere within private network 10.

The computing hardware platforms for PPS 18 and GPS 22 are typical personal computer servers or UNIX servers sized such that they can handle the expected user and data traffic load. For example, PPS 18 and GPS 22 can be servers running MICROSOFT's WINDOWS NT operating system. Thus, PPS 18 and GPS 22 need not contain any special operating system enhancements in order to function as proxy servers in the present invention. However, PPS 18 and GPS 22 do contain special software which enables these devices to function as an integral part of the present invention. The control programs running on PPS 18 and GPS 22 can be written in any language suitable for programming, such as C++, or JAVA.

Figure 3:
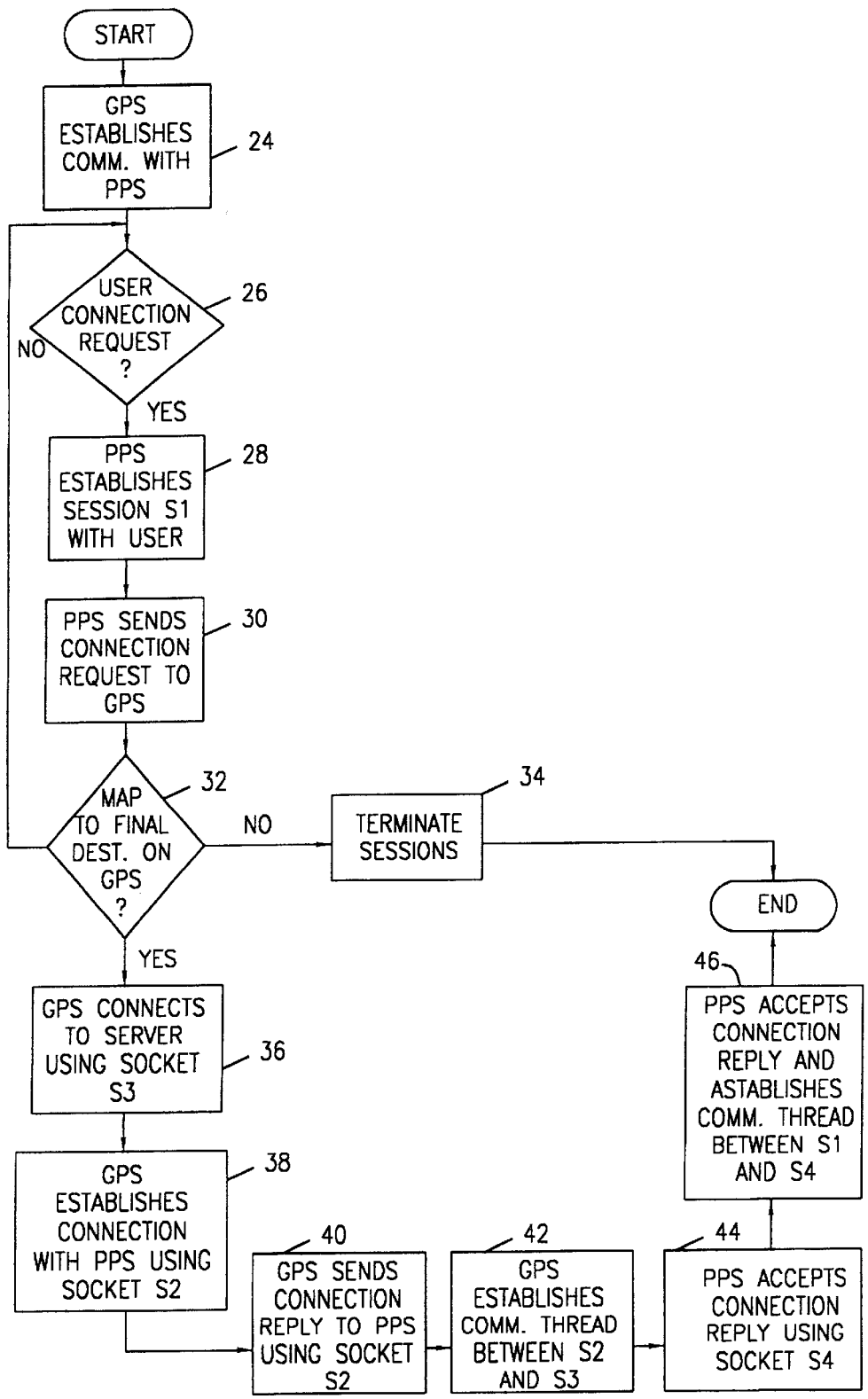
FIG. 3 is a flowchart showing a secure session establishment process of the present invention.

The establishment of a communication session between a user terminal 2 and a host 4 using security system 14 will now be described with reference to FIGS. 2 and 3. Upon system initialization, GPS 22 initiates communications with PPS 18 through internal firewall 20 (step 24). In other words, GPS 22 establishes the connection outbound from itself to PPS 18, thereby requiring only one logical communication port to be opened between GPS 22 and PPS 18. The establishment of the connection by GPS 22 to PPS 18 is hereinafter referred to as the main proxy control connection.

The main proxy control connection is used to request session establishment and not for the actual transfer of data. Also, the main proxy control connection is solely responsible for the send/receive connection request and connection reply packets to establish the connection between user terminal 2 and host 4. In contrast, external firewall 16 is configured to allow many logical ports to be opened to allow communication between user terminals 2 and PPS 18.

As part of the initialization sequence, once the main proxy control connection has been established, GPS 22 uses the main proxy control connection to transmit a table to PPS 18. This table contains a mapping of valid host ports to their respective services.

Once GPS 22 establishes communications with PPS 18, security system 14 is ready to accommodate incoming requests from user terminals 2 (step 26).

When a user terminal 2 seeks to establish a session with host 4, user terminal 2 sends a connection request, typically via the hyper-text transport protocol (HTTP) to a logical port on PPS 18. PPS 18 accepts the connection request from user terminal 2 using a new socket S1 (step 28). Data corresponding to the new connection is stored in a memory vector array on PPS 18. Data stored in the memory vector array includes the address of user terminal 2, such as TCP/IP address, the incoming port identifier on PPS 18, and the service with which user terminal 2 seeks to communicate. Acceptance of the connection request by PPS 18 does not enable any actual data content, i.e. account information, HTML screen data, etc., to flow to or from user terminal 2. PPS 18's acceptance of the connection request merely establishes the first session connection between user terminal 2 and PPS 18.

Next, using the main proxy control connection established on the predetermined port by GPS 22 to PPS 18 in step 24, PPS 18, acting as a client to GPS 22, sends a connection notification request to GPS 22 (step 30). The connection notification request contains the port number information derived from the port to service map as the destination of the connection request. The port number information used by PPS 18 is based on the list of map port numbers sent by GPS 22 to PPS 18 in step 24. Thus, the connection notification request informs GPS 22 of the host to which user terminal 2 wishes to communicate with.

GPS 22 maintains a list in its memory, mapping the list of ports sent to PPS 18 during step 24 to their corresponding actual host addresses for hosts 4. In the case of TCP/IP, the GPS 22 map contains ports and the corresponding TCP/IP address of hosts 4. Upon receiving the connection notification request from PPS 18, GPS 22 verifies that the port connection requested by PPS 18 has an entry in its port map pointing to the final destination host address (step 32).

If GPS 22 does not have a mapping entry to the final destination, it denies the notification request causing PPS 18 to terminate its session with user terminal 2 (step 34).

If GPS 22 has a mapping entry, GPS 22 initiates a connection to the appropriate destination host 4 using a new socket S3 on GPS 22 (step 36). Referring to FIG. 2, GPS 22 establishes a connection to host 4 through private network 10 using socket S3.

At this point in the session establishment process, three separate connections have been established, user 2 to PPS 18 via public network 6 and external firewall 16, GPS 22 to host 4 via private network 10, and GPS 22 to PPS 18 via internal firewall 20 (connection established outbound). There is still no complete logical connection for user data traffic between user terminal 2 and host 4. This is the case because a data communication path between GPS 22 and PPS 18 has not yet been established, only the main proxy control connection has been established.

After initiating the connection to host 4 using socket 3, GPS 22 makes another connection to PPS 18 outbound through internal firewall 20 using new socket S2 (step 38). The new connection between GPS 22 and PPS 18 is a connection different than the main proxy control connection which remains available for the communication of other connection requests from user terminals 2. GPS 22 uses this new connection and sends a connection reply to PPS 18 containing the end-points for connection S3 to the destination host 4 (step 40). The connection reply sent during step 40 is a standard proxy connection reply, known to those of ordinary skill in the art.

Once this client request is accepted by PPS 18, GPS 22 spins off a new processing thread which reads communication data from socket S2 and forwards to socket S3, and vice versa (step 42). In other words, GPS 22 socket S3 is used to communicate with the desired host 4, and GPS 22 socket S2 is used to communicate through firewall 20 to PPS 18. The processing thread in GPS 22 facilitates data transport between sockets S2 and S3.

Once GPS 22 sends its connection reply to PPS 18 in step 40, PPS 18 accepts the connection reply sent by socket S2 on GPS 22 using socket S4 (step 44). It is important to note that step 44 need not follow step 42, since the two steps are mutually exclusive, i.e. the communication thread established between S2 and S3 on GPS 22 occurs independent of PPS 18 accepting the connection reply.

Upon receiving the connection reply from GPS 22, PPS 18 searches through the vector array stored in its memory to map the logical port information received from socket S2 to the address of user terminal 2 which initiated the service session request.

PPS 18 then initiates a new thread establishing a data path between socket S4 and socket S1 (step 46). This new processing thread on PPS 18 reads data from socket S1 and forwards it to socket S4 and vice versa.

At this point, user terminal 2 has a logical client host connection with desired host 4 via the following threads and socket to socket communications:

user terminal 2 to socket S1 on PPS 18;

thread S1–S4;

socket S1 on PPS 18 to socket S2 on GPS 22;

thread S2–S3;

and S3 on GPS 22 to destination host 4.

Thus, the connection from user terminal 2 to destination host 4 originates inbound from GPS 22 to host 4 and originates out from GPS 22 to PPS 18. The initial request from user terminal 2 is maintained on socket S1 in PPS 18 while the session set-up sequence between GPS 22 and destination host 4, and GPS 22 and PPS 18 completes along with the respective processor threads in GPS 22 and PPS 18. Once the logical connection path is established between the originating client and the application server, transmission and reception between user terminal 2 and host 4 occurs via PPS 18 and GPS 22.

Connection requests from multiple user terminals 2 are supported such that a user need not wait for the sequence to complete for another user before starting his own connection request. This is the case because the connection request in step 28 is accepted by PPS 18 and stored, thereby allowing PPS 18 to wait for another connection request. Also, because typical connection protocols, such as HTTP are stateless, the connection between user terminal 2 and PPS 18 lasts for only such time as it takes to obtain and store the connection request and respond back to the user that the request for connection is accepted (step 28). GPS 22 acts as a two-sided client since it initiates connection requests to PPS 18 (steps 24 and 38) and destination host 4 (step 36). PPS 18 acts as a two-sided server since it waits for and accepts connection requests from user terminals 2 (step 28) and GPS 22 (steps 24 and 38). Recall that in step 30, PPS 18 sends a connection request to GPS 22 via an already established main proxy control connection in which that control connection was originally created outbound from GPS 22 to PPS 18. Once established, a communication session between user terminal 2 and host 4 continues until the operating user completes communication. Of course, the application layer of communication between user terminal 2 and host 4 can employ the use of data payload encryption and authentication using typical software such as SSL.

Thus, security system 14 and its accompanying procedure for establishing secure communications is provided by the present invention. In particular, a service provider's hosts 4 are protected from attack from users in public network 6 because firewall 20 does not allow initial service connections originating from its public network side. The initial main proxy control connection is initiated from the private network side of internal firewall 20 by GPS 22, connecting outward to public proxy 18. This allows internal firewall 20 to be configured to deny all inbound connection initiation requests. Thus, even if a hacker were able to compromise external firewall 16, or even PPS 18, the hacker would be unable to jump from PPS 18 to internal firewall 20, GPS 22 or any device attached to private network 10, because internal firewall 20 in configured to deny those requests. In addition, even once a forwarded connection request has been accepted by a host 4, step 38 requires that another outbound connection from GPS 22 to PPS 18 be established to create the actual data payload connection which will eventually be used to transport data to and from user terminal 2 to host 4.

Also, security system 14 and the session establishment procedure of the present invention allow service providers to position hosts 4 anywhere within private network 10 such that host 4 need not be installed and supported on a DMZ network segment. The present invention provides this facility because actual data flow between user terminal 2 and host 4 is segmented into smaller connections, i.e. via the previously described socket and thread communication connections. This allows for effective and efficient management of hosts 4 by the service provider and decreases the costs associated with providing the services.

The present invention may be embodied in other specific forms without departing from the spirit or essential attributes thereof and, accordingly, reference should be made to the appended claims, rather than to the foregoing specification, as indicating the scope of the invention.

What is claimed is:

1. A system for communicating data between a user terminal and a host, said user terminal being coupled to a first network and said host being coupled to a second network, said system comprising:

a first server coupled to said first network, said first server receiving a data communication session establishment request from said user terminal requesting a data communication session between said user terminal and said host;

a second server coupled to said second network;

a main proxy control connection between said first and second servers, said main proxy control connection being established by said second server sending a communication control session establishment request to said first server, wherein said first server is unable to initiate communications between said first and second servers; and a data communication connection established between said first and second servers in response to said data communication session establishment request only if said main proxy control connection has already been established between said first and second servers, wherein said data communication connection is different from said main proxy control connection.

2. The system for communicating data between a user terminal and a host according to claim 1, further comprising a first firewall coupled between said first server and said second server.

3. The system for communicating data between a user terminal and a host according to claim 1, further comprising a second firewall coupled between said first network and said first server.

4. The system for communicating data between a user terminal and a host according to claim 2, wherein said first firewall denies all communication control session establishment requests other than those communication control session establishment requests which originate from said second server and are destined for said first server.

5. The system for communicating data between a user terminal and a host according to claim 1, wherein said data communication session establishment request is transmitted from said first server to said second server using said main proxy control connection.

6. The system for communicating data between a user terminal and a host according to claim 1, wherein said first server supports multiple data communication connections.

7. The system for communicating data between a user terminal and a host according to claim 1, wherein said second server supports multiple data communication connections.

8. The system for communicating data between a user terminal and a host according to claim 1, wherein said first server receives a port to service map from said second server.

9. The system for communicating data between a user terminal and a host according to claim 8, wherein said first server receives said port to service map on said main proxy control connection.

10. The system for communicating data between a user terminal and a host according to claim 1, wherein said second server comprises a port to host address map.

11. The system for communicating data between a user terminal and a host according to claim 1, further comprising:

a first socket established in said first server, said first socket providing data communication between said first server and said user terminal;

a second socket established in said second server, said second socket providing data communication between said second server and said host;

a third socket established in said second server, said third socket providing data communication between said first server and said second socket; and a fourth socket established in said first server, said forth socket providing data communication between said first socket and said third socket, wherein said data communication connection between said user terminal and said host is provided through said first socket, said fourth socket; said third socket, and said second socket.

12. A method for communicating data between a user terminal and a host, said user terminal being coupled to a first network and said host being coupled to a second network, said method comprising:

establishing a main proxy control connection between a first server and a second server, said second server initiating said main proxy control connection, wherein said first server is unable to initiate communications between said first and second servers;

establishing a first data session between said first server and said user terminal based on a user connection request, said first data session transferring data between said user terminal and said first server;

establishing a second data session between said second server and said host and a third data session between said first server and said second server, said second data session transferring data between said second server and said host and said third data session transferring data between said first server and said second server wherein said third data session does not occur on said main proxy control connection.

13. The method for communicating data between a user terminal and a host according to claim 12, further comprising:

invoking a first computing thread in said first server, said first computing thread transferring data between said first data session and said third data session; and invoking a second computing thread in said second server, said second computing thread transferring data between said second data session and said third data session.

14. The method for communicating data between a user terminal and a host according to claim 13, wherein data transfer in each of said first data session, said second data session, said third data session, said first computing thread and said second computing thread is bidirectional.

15. The method for communicating data between a user terminal and a host-according to claim 12, further comprising sending a connection notification request from said first server to said second server, wherein said second data session and said third data session are established in accordance with said connection notification request.

16. The method for communicating data between a user terminal and a host according to claim 12, wherein a firewall blocks said establishment of said main proxy control connection unless a request for said control connection originates from said second server and is destined for said first server.

17. The method for communicating data between a user terminal and a host according to claim 15, further comprising sending a port to session map from said first server to said second server using said main proxy control connection.

18. The method for communicating data between a user terminal and a host according to claim 17, wherein said connection notification request includes a port derived from said port to session map.

19. The method for communicating data between a user terminal and a host according to claim 18, wherein said connection notification request is denied by said second server if said port does not further map to a host in accordance with a host map in said second server.

20. The method for communicating data between a user terminal and a host according to claim 12, wherein said first server supports multiple data communication sessions between one or more user terminals and one or more hosts.

21. The method for communicating data over between a user terminal and a host according to claim 12, wherein said second server supports multiple data communication sessions between one or more user terminals and one or more hosts.

22. The method for communicating data according to claim 12, further comprising:
 establishing a first socket in said first server after receiving said user connection request, said first socket providing said first data session between said first server and said user terminal;
 establishing a second socket in said second server, said second socket providing said second data session between said second server and said host.
 establishing a third socket in said second server a , said third socket providing a data communication connection between said first server and said second socket; and
 establishing a fourth socket in said first server, said fourth socket providing a data communication connection between said first socket and said third socket, wherein said third data session is provided by said third and fourth sockets.

23. A method for communicating data between a user terminal and a host, said user terminal being coupled to a first network and said host being coupled to a second network, said method comprising:
 initiating communications by establishing a communication control session between a first server and a second server, said second server sending a communication control session initiation request to said first servers initiate communications between said first and second servers;
 receiving, in said first server, a data session establishment request from said user terminal and generating a data connection request in response to said data session establishment request; and
 receiving, in said second server, said data connection request and establishing data communications with said host in accordance with said data connection request wherein said data communications session is separate from said communication control session.

24. The method for communicating data between a user terminal and a host according to claim 23, wherein said data connection request is transmitted from said first server to said second server using said communication control session.

25. The method for communicating data between a user terminal and a host according to claim 23, further comprising sending a port to service map from said second server to said first server.

26. The method for communicating data between a user terminal and a host according to claim 25, wherein said second server sends said port to service map on said communication control session.

* * * * *